(12) United States Patent
Hamrin et al.

(10) Patent No.: US 7,278,945 B2
(45) Date of Patent: Oct. 9, 2007

(54) DIFFERENTIAL

(75) Inventors: John Edward Hamrin, Bemidji, MN (US); Matthew Douglas Cann, Bemidji, MN (US); Joel Dunlap, Bemidji, MN (US); Gregory L. Maki, Solway, MN (US)

(73) Assignee: TEAM Industries, Inc., Bagley, MN (US)

( * ) Notice: Subject to any disclaimer, the term of this patent is extended or adjusted under 35 U.S.C. 154(b) by 170 days.

(21) Appl. No.: 11/251,094

(22) Filed: Oct. 14, 2005

(65) Prior Publication Data
US 2007/0087890 A1    Apr. 19, 2007

(51) Int. Cl.
*F16H 48/30* (2006.01)
(52) U.S. Cl. ..................................... 475/150
(58) Field of Classification Search ............... 475/150, 475/249, 252
See application file for complete search history.

(56) References Cited

U.S. PATENT DOCUMENTS

| | | | |
|---|---|---|---|
| 4,488,454 A | 12/1984 | Goscenski, Jr. | |
| 4,507,984 A | 4/1985 | Goscenski, Jr. | |
| 4,513,633 A | 4/1985 | Goscenski, Jr. | |
| 4,544,869 A | 10/1985 | Pittaway | |
| 4,559,846 A | 12/1985 | Cochran et al. | |
| 4,598,609 A | 7/1986 | Nellums et al. | |
| 4,715,467 A | 12/1987 | Sakai | |
| 4,950,214 A | 8/1990 | Botterill | |
| 5,080,640 A * | 1/1992 | Botterill | 475/231 |
| 5,106,349 A * | 4/1992 | Botterill et al. | 475/150 |
| 5,195,604 A | 3/1993 | Brockett et al. | |
| 5,209,707 A | 5/1993 | Teraoka | |
| 5,423,235 A | 6/1995 | Botterill et al. | |
| 6,319,166 B1 | 11/2001 | Kyle et al. | |
| 6,537,172 B1 | 3/2003 | McAuliffe, Jr. et al. | |
| 6,604,731 B2 | 8/2003 | Hodge | |
| 6,659,256 B2 | 12/2003 | Seki et al. | |

\* cited by examiner

*Primary Examiner*—Dirk Wright
(74) *Attorney, Agent, or Firm*—IPLM Group, P.A.

(57) ABSTRACT

A differential (100) includes a clutch pack that is activated by rotational movement of a ball ramp (31) that results in a linear force applied to the reaction plates (41) and friction plates (42). The ball ramp (31) is controlled by a DC motor (114) that has a high efficiency of a gear train to allow the use of the DC motor to control the activation of the clutch pack.

20 Claims, 10 Drawing Sheets

DIFFERENTIAL

BACKGROUND OF THE INVENTION

1. Field of the Invention

This invention relates generally to a differential and more particularly to a differential wherein a coupling torque is variable and a DC motor is utilized to vary the coupling torque.

2. Description of the Prior Art

In an all-terrain vehicle or utility vehicle, the differential is used to distribute power to the front wheels, while having the ability to allow for a difference in rotational speed at each wheel from each other and the rear wheels for smooth, low-effort steering. One of the traditional methods in practice is to employ engagement dogs (or splines, etc.) to control left to right differentiation. A limitation with this type of system is the inability to engage or disengage "on the fly". This type of engagement is "all or nothing"; it cannot be modulated like a clutch that is capable of slipping. It is also implicated that it cannot effectively be employed on an "automatic" system that engages only when wheel slip has been detected. A driver using this type of system therefore must anticipate driving conditions, and choose between greater traction capability or steering effort and handling.

The Polaris/Hilliard system attempts to overcome some of these obstacles with over-running clutches. The disadvantages of this type of system include: The system must operate with a front to rear ratio of ~0.83:1, depending on the vehicle. This is due to the need to prevent engagement on surfaces of good traction during turns. This ratio difference results in sudden engagement under some circumstances, as well as a loss of ultimate traction, as the front and rear fight each other with different rotational rates when the system is engaged. Additionally, the front wheels cannot be used for engine braking, severely limiting the system's capability in steep downhill terrain.

Another method utilized by Honda employs a differential mechanism that uses differential cams and a roller clutch to engage/disengage the FWD. The Honda system as a whole is, however, very different in two specific manners: 1) It does not have computerized automatic engagement of the FWD, and 2) it utilizes a fundamentally different mechanism for the left/right power distribution. This part of the system cannot be automatically or manually controlled and will not supply significant power to a tractive wheel if the other wheel is completely non-tractive (in the air or on ice). Also, the tuning is fundamental to the design and cannot accept user or computer input.

Another traditional automotive method is to employ a Torsen® style limited slip device to act between the left and right tires. This type of the system cannot be automatically or manually controlled and will not supply significant power to a tractive wheel if the other wheel is completely non-tractive (in the air or on ice). Also, the tuning is fundamental to the design and cannot accept user or computer input.

Another traditional method is to employ a "limited slip" mechanism between the left and the right wheels. Since ATV's don't have power steering to overcome the resulting increase in steering effort, steering effort becomes unacceptably high. Also, the amount of engine torque that can be transmitted to only one wheel is severely limited, reducing off-road capability.

Another traditional automatic method uses the silicon viscous technology to apply linear force to a clutch pack in response to differences in speed between the left and the right front wheels. A limitation of this method is that it cannot be tuned as a function of vehicle speed and therefore compromises high-speed handling with low-speed capability. In addition, this type of system cannot be disabled, even in two-wheel drive mode.

An automatic method in current practice uses fly-weights that spin in accordance with the difference in lift and right wheel speed. At some preset speed, the fly-weights cause the engagement of a locking mechanism. This type of system is well known for its dangerous handle-bar jerk and poor handling upon engagement when used on a FWD.

In designing an all-terrain vehicle or utility vehicle, several characteristics are sought to be optimized. These include the requirements that the differential is narrow; light; provides for a low-steering effort; has predictable dynamics to minimize unexpected handlebar motion, unexpected braking effects, and sudden loss of capabilities during changing riding conditions; and true four-wheel drive, wherein one wheel with poor traction must not prevent significant engine torque delivery to the other wheel.

The present invention addresses the limitations of the prior art and provides for a new differential.

SUMMARY OF THE INVENTION

In one embodiment, the invention is a differential for use in an all-terrain vehicle or utility vehicle having a motor. The differential includes a differential housing having a first, carrier section and a second, cover section. A first side gear is adapted and configured to receive a first shaft for driving a first wheel and a second side gear is adapted and configured to receive a second shaft for driving a second wheel. The differential includes at least one set of differential gears, each set including a first differential gear positioned to engage a first side gear and a second differential gear positioned to engage the second gear. The first differential gear also engages the second differential gear. A driven member is rotatably mounted in the housing, the driven member is adapted and configured to be driven by the motor. A clutch pack having a set of friction plates and a set of reaction plates is provided. One of the sets of friction plates and reaction plates is operatively connected to the driven member and the other of the sets of friction plates and reaction plates is operatively connected to one of the first and second side gears. A ball ramp is positioned between the housing and the clutch pack. A DC motor is operatively connected to the ball ramp, wherein actuation of the DC motor rotates the ball ramp resulting in linear movement of the ball ramp and compression of the clutch pack, thereby coupling the driven member to one of the first and second side gears.

In one embodiment, the invention is a differential for use in an all-terrain vehicle or utility vehicle having a motor. The differential includes a differential housing having a first, carrier section and a second, cover section. A first side gear is adapted and configured to receive a first shaft for driving a first wheel and a second side gear is adapted and configured to receive a second shaft for driving a second wheel. The differential includes at least one set of planet gears, each set including a first planet gear positioned to engage a first side gear and rotatably mounted on a first pin operatively connected to a housing and a second planet gear positioned to engage the second gear and rotatably mounted on a second pin. The second pin is operatively connected to the housing and the first planet gear also engages the second planet gear. A driven member is rotatably mounted in the housing, the driven member is adapted and configured to be driven by the motor. A clutch pack having a set of friction plates and a set of reaction plates is provided. One of the sets of friction plates and reaction plates is operatively connected to the driven member and the other of the sets of friction plates and reaction plates is operatively connected to one of the first and second side gears. A ball ramp is positioned between the housing and the clutch pack. A DC motor is operatively connected to the ball ramp, wherein actuation of the DC motor rotates the ball ramp resulting in linear movement of the ball ramp and compression of the clutch pack, thereby coupling the driven member to one of the first and second side gears.

DETAILED DESCRIPTION OF A PREFERRED EMBODIMENT

Referring to the drawings, wherein like numerals represent like parts throughout the several views, there is generally disclosed at 100 a differential. Since engaging the differential clutch (reduction in differential capability), greatly increases steering effort, it is engaged only when left and right wheel speed sensors detect a difference in rate beyond a preset value. Hysteresis is employed to prevent excessive cycling. Additionally, the clutch pack engagement is variable. At slower speeds, the torque capacity is increased. As vehicle speed increases, the torque capability is reduced, until at high enough speeds, the clutch pack does not engage. This is done to preserve proper high-speed handling while retaining low-speed tractive capability. Additionally, there may also be a feature that when the system senses a need for left/right torque capacity, the system energizes the front/rear roller clutch mechanism. This is done to prevent torque reversals in the front wheel drive from disengaging the front wheel drive and causing a cycling of automatic engagement routine during left/right clutch engagement. However, the present invention does not address the control system for doing so. The present invention is directed toward the differential 100. A suitable control system may be used. One such system is described in a U.S. patent application entitled "All-Terrain or Utility Vehicle Having Selectable Drive Characteristics and Method Therefore", Ser No. 11/251,097, filed on even date herewith and owned by the owner of the present application, TEAM Industries, Inc., which is hereby incorporated by reference.

Figure 4:
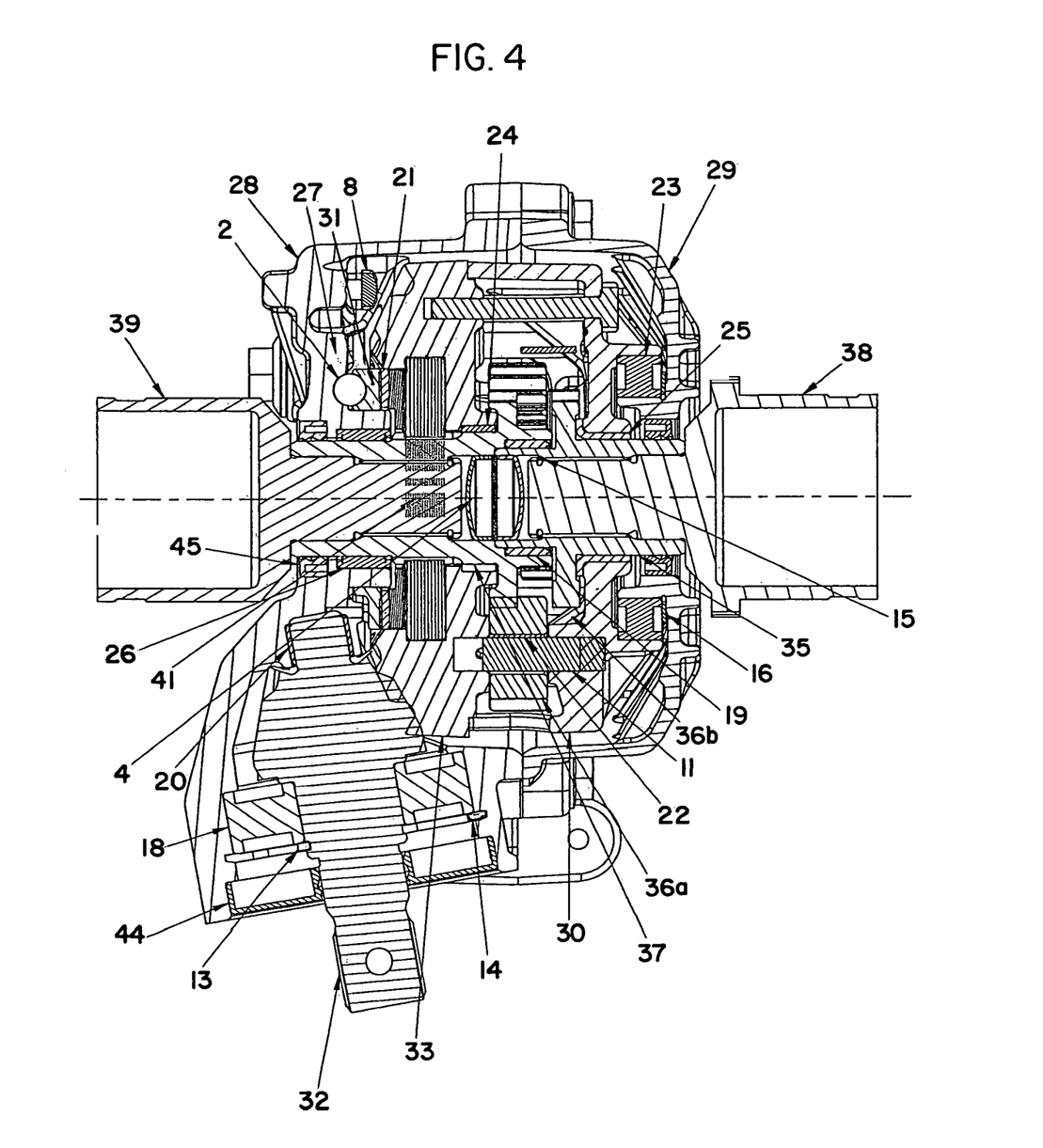
FIG. 4 is a cross-sectional view of the differential shown in FIG. 3, taken generally along the lines 4-4.
Figure 5:
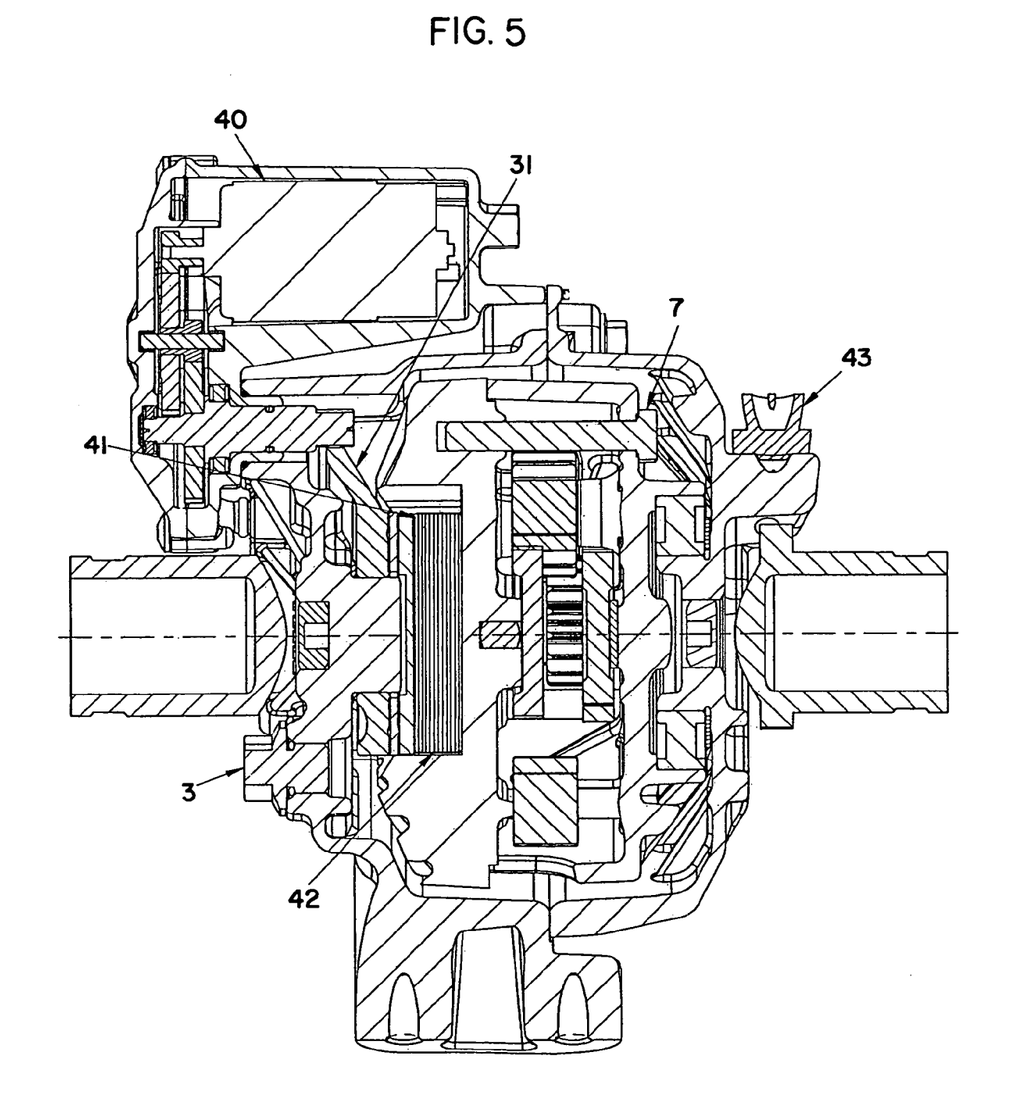
FIG. 5 is a cross-sectional view of the differential shown in FIG. 3, taken generally along the lines 5-5.

Referring now to FIGS. 1, 2a, 2b and 6 to show the components of the differential 100 and FIGS. 4 and 5 to show the components in the assembled differential 100, it is seen that the differential 100 includes a housing having a first cover section 28, a carrier 30 and a second cover section 29. The first cover 28 and second cover 29 form an outer housing and define an inner cavity in which a majority of the components are positioned. The first cover section 28 has a first circular opening 28a through which a pinion 32 is positioned. The pinion 32 is assembled in the opening 28a with a bearing 20, ball bearing 18, retaining ring 13, beveled retaining ring 14 and seal 44. The pinion 32 has a plurality of teeth 32a at one end. The pinion 32 is rotated, by means well known in the art and is driven by the motor of the ATV or utility vehicle.

Figure 1:
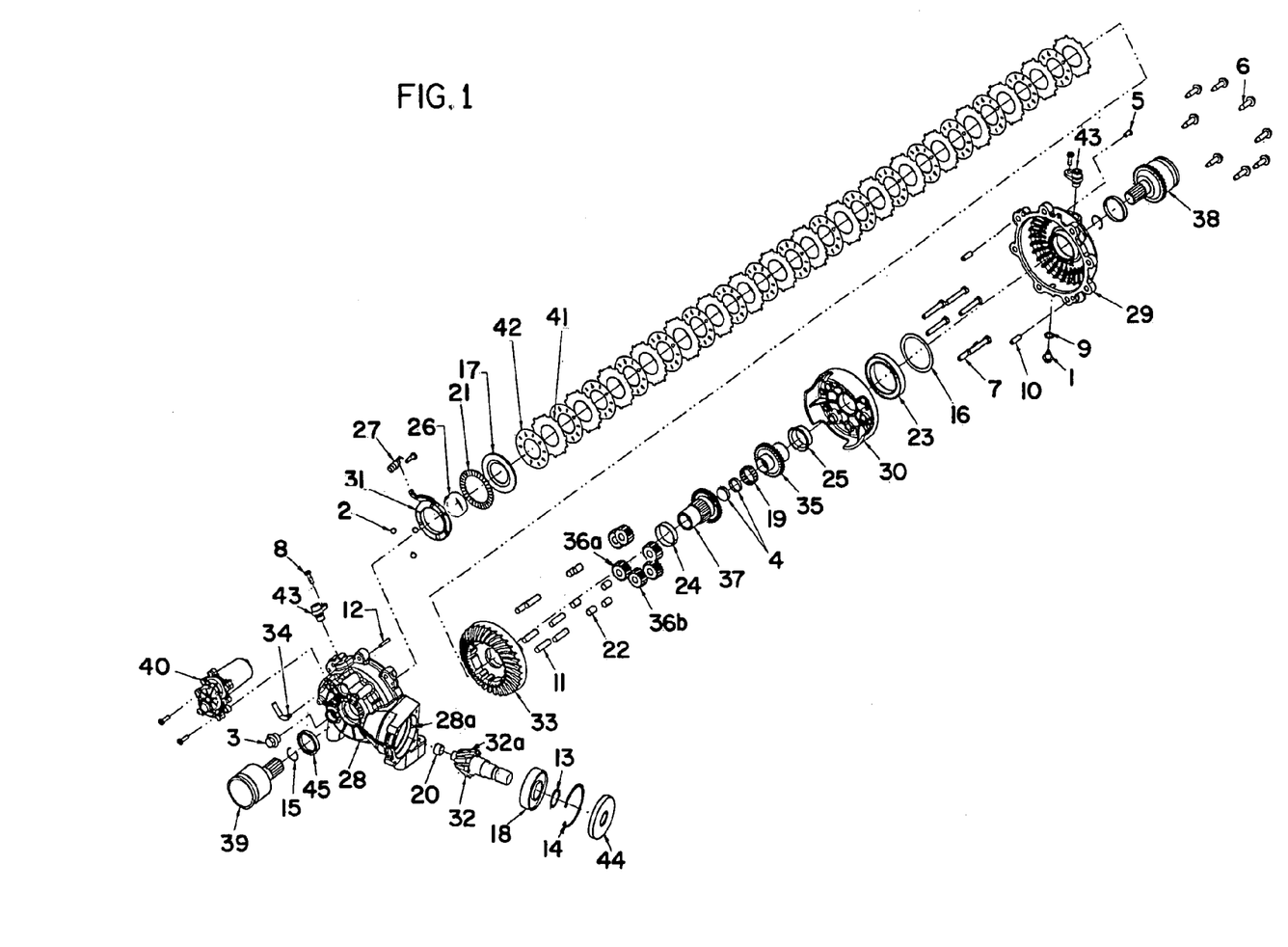
FIG. 1 is an exploded perspective of a differential of the present invention.
Figure 2A:
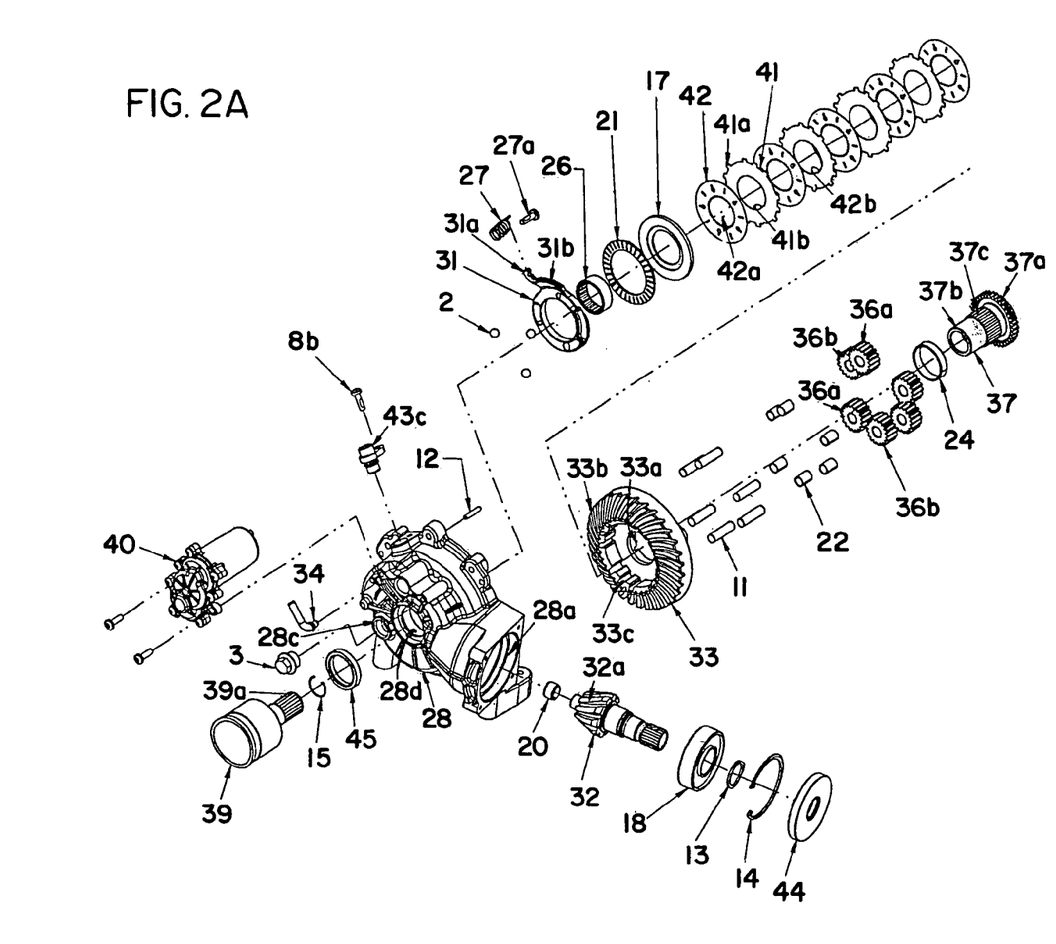
FIGS. 2a and 2b are enlarged views of the exploded differential shown in FIG. 1.
Figure 2B:
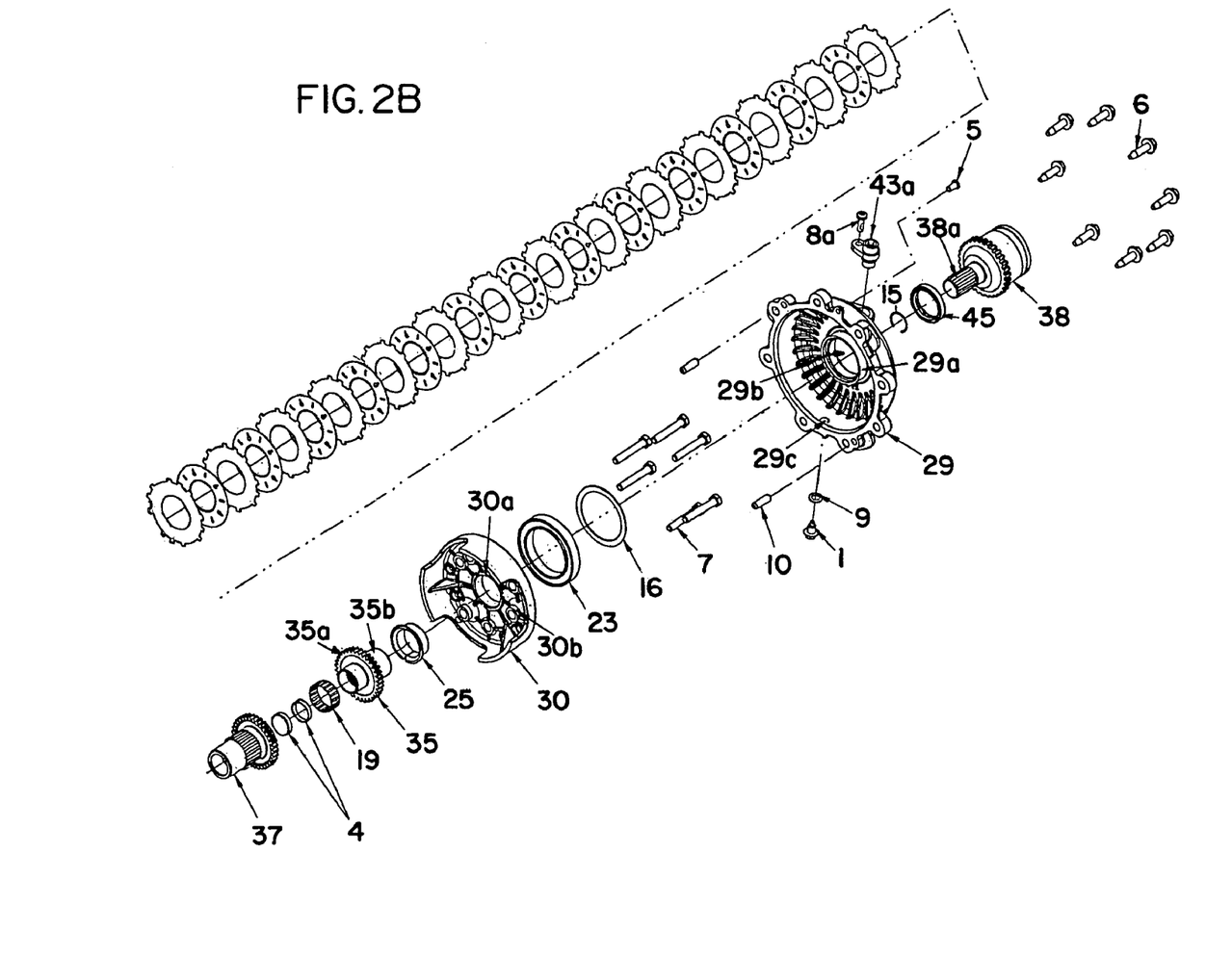
Figure 3:
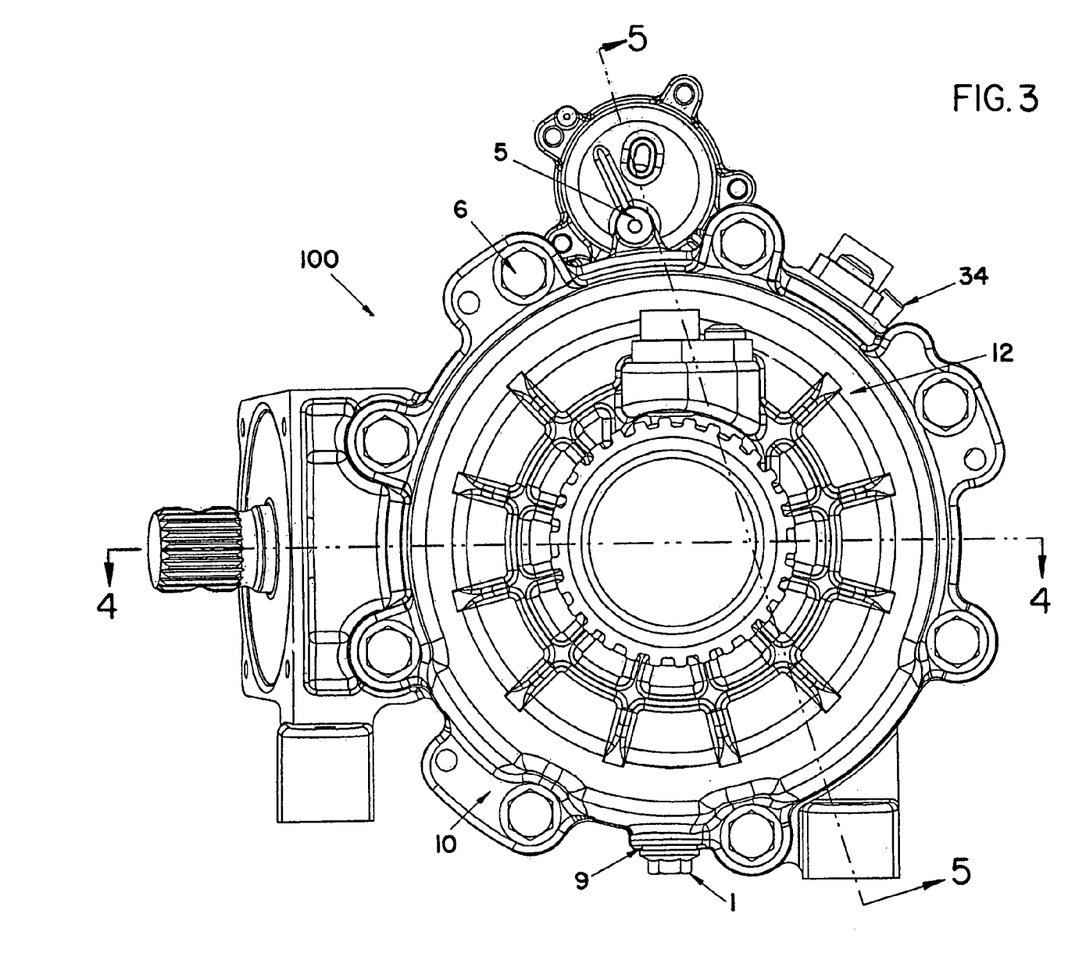
FIG. 3 is a front elevational view of the differential shown in FIG. 1 assembled.

A first side gear 35 has a plurality of teeth 35a and a shaft 35b. A bearing 25 is positioned on the shaft 35b and the shaft 35b extends through a central bore 30a of the carrier 30. A bearing 23 and shim 16 are positioned on the hub 29a which defines the opening 29b of the cover section 29. The shaft 35b extends into the opening 29b. A first half shaft 38 has a plurality of splines 38a and are inserted into a bore of shaft 35b which has corresponding splines (not shown), to thereby drive the half shaft 38 and a wheel on one side. A suitable retaining ring 15 and seal 45 are utilized. Positioned around the end of the shaft 35b that extends to the left, as viewed in FIG. 2, is a bearing 19. Suitable plugs 4 may also be utilized.

A second side gear 37 has a plurality of teeth 37a and a shaft 37b on which a plurality of splines 37c are formed. There are splines (not shown) internal to the shaft 37b. The shaft 37b has a bearing 24 around it and is positioned through a central bore 33a of ring gear 33. The shaft 37b extends into the bore 28b of the housing 28. A second half shaft 39 has a plurality of splines 39a which mesh with splines (not shown) in the bore of the shaft 37b, wherein rotational movement of the second side gear 37 is transmitted to the second half shaft 39 and a wheel on a second side. A suitable seal 45 and retaining ring 15 may be utilized, as is well known in the art. The ring gear 33 has a plurality of teeth 33b that, when positioned in the cavity of the housing 28, meshes with the teeth 32a of the pinion gear 32.

Three sets of planet gears include three planet gears 36a and three planet gears 36b. The planet gears 36a and 36b are just one example of "differential gears" that may be used. Other types of differential gears include, but are not limited to, bevel gears or other types well known in the art. Three sets of planet gears are utilized in order to make the differential stronger, and it is understood that either fewer or more sets of planetary gears may be utilized. When assembled, the three planet gears 36a mesh with the teeth 37a of the second side gear 37 and the three planet gears 36b mesh with the teeth 35a of the first side gear 35. In each set, the planet gears 36a also mesh with their corresponding planet gear 36b. The planet gears 36a, 36b are mounted on dowel pins 11 with bearings 22, as is well known in the art. The dowel pins 11 are seated and bosses 30b of the carrier 30 and their other ends in suitable bosses in the housing 28 as is well known in the art. A clutch pack includes a plurality of reaction plates 41 alternating with a plurality of friction plates 42, although it is not necessary that they completely alternate. The friction plates 42 have a central bore 42a and are positioned on the shaft 37b of the side gear 37. The friction plates 42 have a splined inner diameter that matches with the splines 37c of the shaft 37, thereby tying the friction plates to the side gear 37. The reaction plates 41 have a plurality of extensions 41a. The extensions 41a are positioned in slots 33c, thereby tying the reaction plates 41 to the ring gear 33. It is understood that the ring gear 33 is the driven member, that is driven by the pinion 32. However, it is understood that other suitable constructions such as a sprocket could also be utilized in the present invention. The reaction plates 41 also have a central bore 41b for mounting over the shaft 37b. A ball ramp system, generally designated at 110, includes a rotating ball ramp 31 that is generally circular and is positioned in an annular cavity formed in the housing 28. Three roller balls 2 are positioned in slots 28d formed in the housing 28 and slots 31c. Thus far described, such a ball ramp in well known in the art. It can be seen that the ball ramp system 110 includes the ball ramp 31, roller balls 2 and housing 28. Positioned between the ball ramp 31 and the friction plate 42 is a shim 17, and needle thrust bearing 21. The ball ramp 31 has an angle of 5 degrees.

The ball ramp 31 includes an actuator arm 31a which has a plurality of teeth 31b formed therein. The teeth 31b are utilized to cause rotational movement of the ball ramp 31, as well be described more fully hereafter. This movement is caused by an actuator assembly 40, an exploded view of which is shown in FIG. 6.

The carrier 30 is secured to the housing 28 by screws 7. The housing cover section 29 is secured to the first cover section 28 by screws 6. A first speed sensor 43 is secured to the housing section 29 by screw 8a. The speed sensor 43a senses the speed of the half shaft 38. A second speed sensor 43c is secured to the housing by screw 8b and senses the speed of the half shaft 39. A vent tube 34 may be utilized. A hex flange plug 3 is used to plug the opening 28c of the housing 28. A plug 1 and washer 9 are used to plug the opening 29c. A dowel pin 12 is inserted into openings in each of the sections 28 and 29 and provides a stop for a spring return for the ball ramp 31 A hex screw 5 holds the back of the actuator to the case for additional strength. A pin 10 extends between first cover half 28 and second cover half 29 and is used for case alignment, as is well known in the art.

An extension spring 27 is attached to the end of the actuator arm 31 and returns the actuator arm back to a first, non-differentiating position. Screw 27a holds the other end of spring 27.

Figure 6:
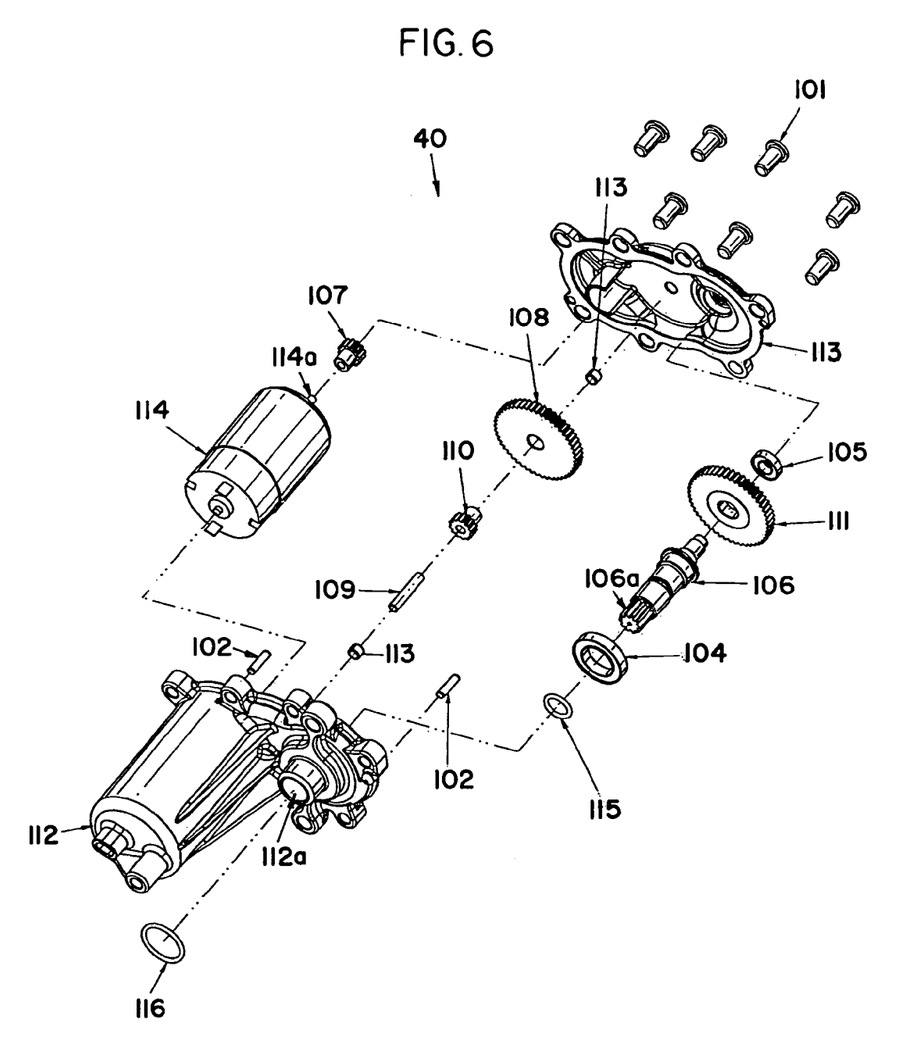
FIG. 6 is an exploded perspective view of the actuator, which is also shown in FIG. 1.

Referring now to FIG. 6, there is shown an exploded perspective view of the actuator 40. The actuator 40 includes a house or casing 112 that has a DC motor 114 positioned in the cavity of the case 112. The DC motor 114 is a motor having an electrical power of 39 watts, at rated load such as model number RS-555VC-3267 made by Mabuchi Motor America Corp. An actuator gear 107 is mounted on the output shaft 114a of the DC motor 114. A mid-actuator shaft 109 is mounted for rotation with bearings 113 between the case 112 and the cover 113. On the mid-actuator shaft 109 is mounted a mid-actuator gear 110 that meshes with actuator gear 107. Also mounted on the mid-actuator shaft 109 is an actuator gear 108. An actuator arm shaft 106 is rotatably mounted between the case 112 and cover 113 with ball bearings 104 and 105 on the actuator shaft 106 is mounted an actuator gear 111. O-rings 115 and 116 are positioned on the actuator shaft 106. The actuator gear 108 meshes with the actuator gear 111. At the one end of the actuator shaft 106 is a gear 106a. The gear 106a extends out of the bore 112a of case 112. The gear 106a meshes with the teeth 31b on the moveable ball ramp member 31. Screws 101 are used to secure the cover 113 to the case 112. Dowel pins 102 are positioned between the case 112 and cover 113 for case alignment, as is well known in the art.

Figure 7:
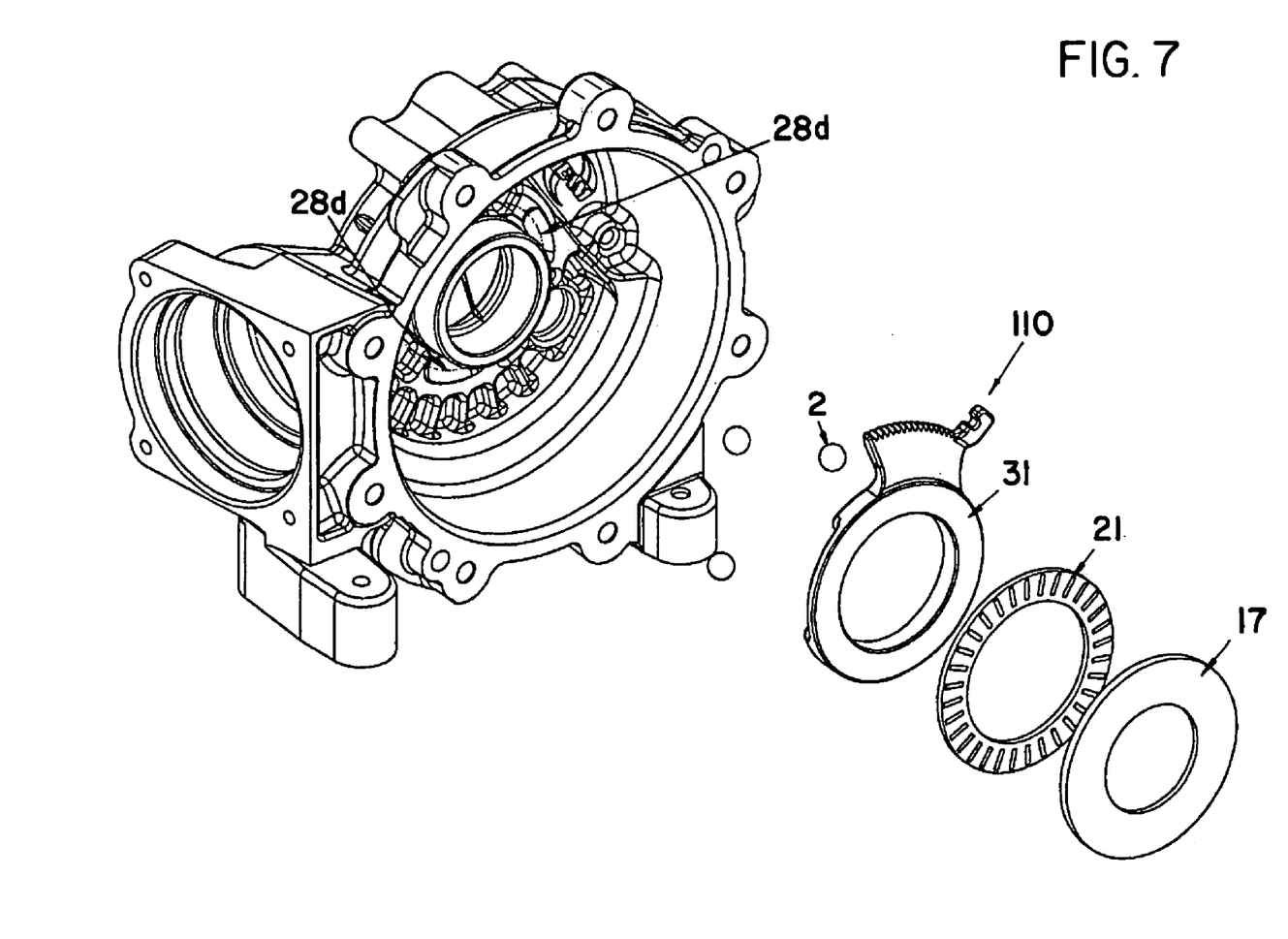
FIG. 7 is an exploded perspective showing the ball ramp system 110 and first cover section 28.
Figure 8:
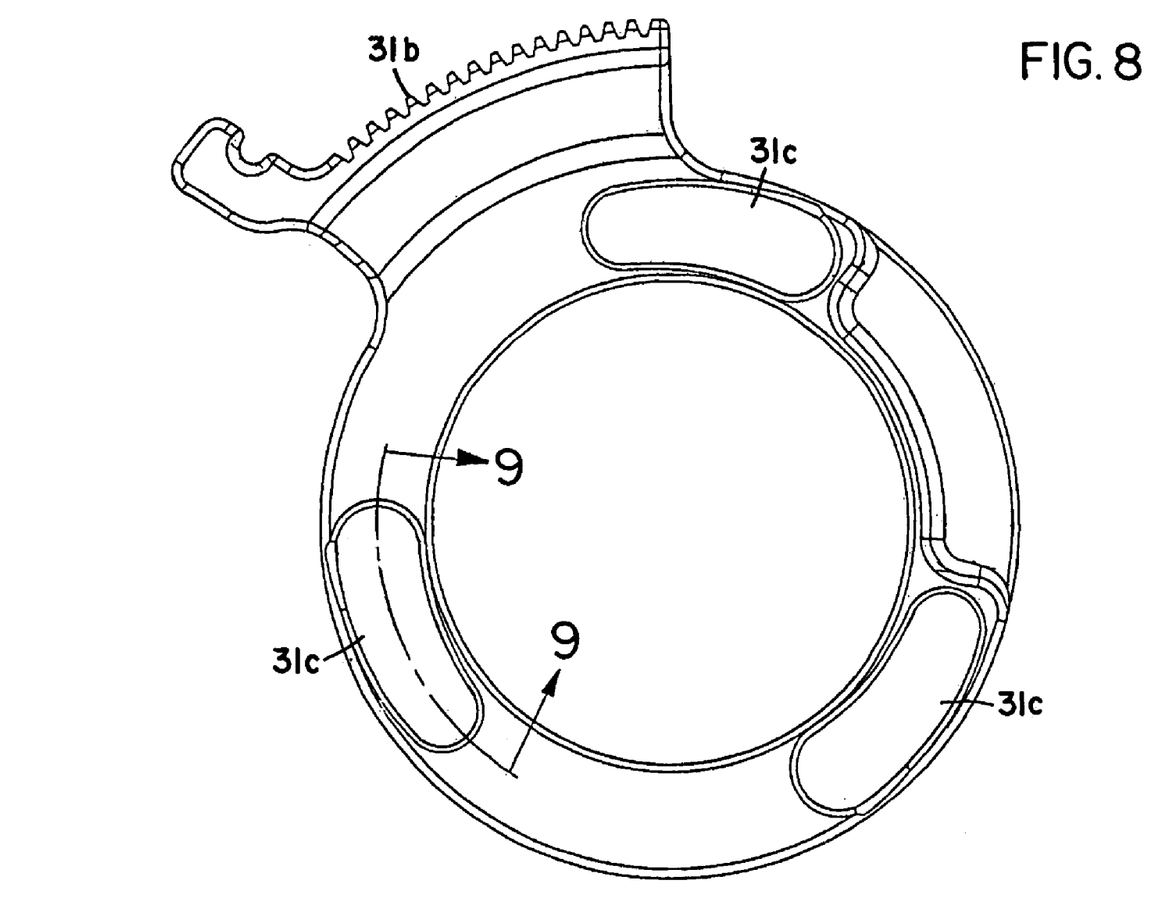
FIG. 8 is a front elevational view of the ball ramp 31.
Figure 9:
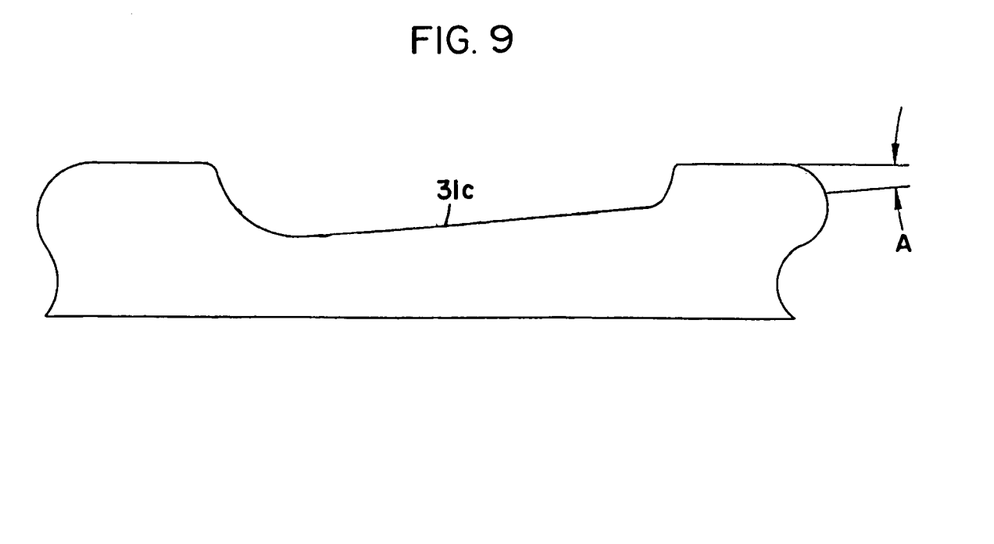
FIG. 9 is a wrapped cross-sectional view taken generally along the lines 9-9 of FIG. 8.
Figure 10:
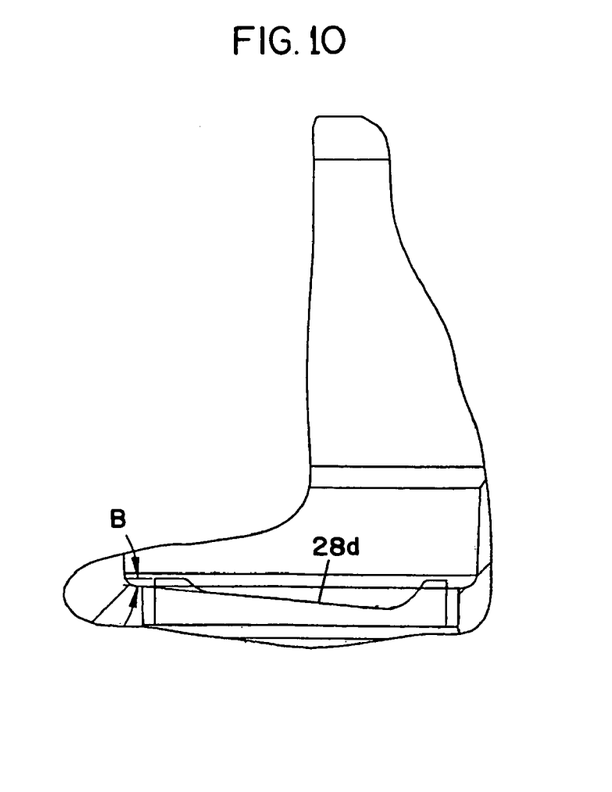
FIG. 10 is a wrapped cross-sectional view showing the slot 28d in the housing 28.

Referring now to FIG. 7, there are three slots 28d that are formed in the housing first cover section 28. The slots 28d, as also shown in FIG. 10, are shaped similar to the slots 31c shown in FIG. 9. FIG. 8 shows the front elevational view of the ball ramp 31 with the teeth 31b. Three slots 31c are formed around the perimeter of the ball ramp 31 and the roller balls 2 are positioned therein. The angle "A" is shown as 5 degrees. It is up this angle that the roller balls 2 move as the ball ramp 31 is rotated. FIG. 10 shows the corresponding slot 28d formed in the housing 28 and also has a similar angle "B" of 5 degrees.

In the embodiment described, the mechanical power enters the differential 100 from the pinion gear 32 to the ring gear 33. With other embodiments, the power may enter the differential 100 via a chain drive or parallel axis gearing. Differential action is provided by the planet gears 36a, 36b coupled with side gears 35, 37, as it is well known in the art. As previously mentioned, differential action could also be provided by side gears coupled with bevel gears, as is well known in the art. Since a differential will only deliver the lesser torque that is available to the left and right wheels, loss of traction on one wheel results in loss of torque delivery to the other wheel. A clutch pack, having reaction plates 41 and friction plates 42, nested in the ring gear 33, couples a side gear 37 with the ring gear 33, with a coupling torque that is proportional to the amount of linear force applied to the clutch pack. Since a differential is a summing device ("left wheel speed"+"right wheel speed"=2×"ring gear speed"), the coupling action will reduce or eliminate the speed differential between the two wheels during events that cause one wheel to experience a loss of traction.

To provide a coupling torque between the ring gear 33 and the side gear 37, the clutch pack (reaction plates 41 and friction plates 42) requires an applied linear force. This is accomplished via the DC motor 114 coupled through a gear train, as previously described, to a ball ramp system, including a ball ramp 31, roller balls 2 and cover section 28. The ball ramp 31 is separated from rotation of the friction plates and reaction plates 42 by a thrust bearing 21. The high efficiency of the gear train, and the ball ramp system allows the DC motor 114 to be small and easily controlled by a low cost computerized controller (not shown), based on various input, such as input from the speed sensors 43.

There is a relationship between the DC motor size, gear ratios and ramp angle. The DC motor has electrical power at rated load of preferably from 40 to 175 watts and more preferably from 64 to 125 watts or a mechanical power at rated loads of from 19 to 82 watts and more preferably from 30 to 60 watts. In the example previously given, the rating is 82.38 electrical power and 38.76 mechanical power.

The gear train, from the motor to the actuator, preferably has a ratio of from 100:1 to 500:1 and more preferably from 150:1 to 350:1. The ball ramp angle, for both the ramp on the ball ramp 31 and housing 28 is preferably from 0.5 degrees to 15 degrees and more preferably from 2 degrees to 10 degrees. In the embodiment shown, the gear ratio is 212.8:1 and the ramp angles "A" and "B" are 5 degrees.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A differential for use in and all-terrain vehicle or a utility vehicle having a motor, the differential comprising:
    (a) a differential housing having a first, carrier section and a second, cover section;
    (b) first and second side gears, the first side gear adapted and configured to receive a first shaft for driving a first wheel and the second side gear adapted and configured to receive a second shaft for driving a second wheel;
(c) at least one set of differential gears, each set comprising:
  (i) a first differential gear positioned to engage the first side gear and rotatably mounted; and
  (ii) a second differential gear positioned to engage the second side gear and rotatably mounted, the first differential gear also engaging the second differential gear; and
(d) a driven member rotatably mounted in the housing, the driven member adapted and configured to be driven by the motor;
(e) a clutch pack having a set of friction plates and a set of reaction plates;
(f) one of the sets of friction plates and reaction plates operatively connected to the driven member and the other of the sets of friction plates and reaction plates operatively connected to one of the first and second side gears;
(g) a ball ramp positioned between the housing and the clutch pack, and
(h) a DC motor operatively connected to the ball ramp, wherein actuation of the DC motor rotates the ball ramp resulting in linear movement of the ball ramp and compression of the clutch pack, thereby coupling the driven member to the one of the first and second side gears.

2. The differential of claim 1, wherein the driven member is a ring gear.

3. The differential of claim 1, the housing further comprising a third, cover section.

4. The differential of claim 1, wherein the friction plates alternate with the reaction plates.

5. The differential of claim 1, further comprising the DC motor having an electrical power, at rated loads, of from 40 to 175 watts.

6. The differential of claim 5, wherein the DC motor is from 64 to 125 watts.

7. The differential of claim 5, further comprising a gear train, the gear train comprising:
  (a) a first gear operatively connected to and driven by the DC motor; and
  (b) a second gear operatively connected to the ball ramp, the gear train having a gear ratio of at least 100:1 to 500:1.

8. The differential of claim 7, wherein the gear ratio is from 150:1 to 350:1.

9. The differential of claim 7, further comprising the ball ramp having an angled surface on which a roller ball moves, the angled surface having an angle of from 0.5 degrees to 15 degrees.

10. The differential of claim 9, wherein the angle is from 2 degrees to 10 degrees.

11. A differential for use in and all-terrain vehicle or a utility vehicle having a motor, the differential comprising:
  (a) a differential housing having a first, carrier section and a second, cover section;
  (b) first and second side gears, the first side gear adapted and configured to receive a first shaft for driving a first wheel and the second side gear adapted and configured to receive a second shaft for driving a second wheel;
  (c) at least one set of planet gears, each set comprising:
    (i) a first planet gear positioned to engage the first side gear and rotatably mounted on a first pin operatively connected to the housing; and
    (ii) a second planet gear positioned to engage the second side gear and rotatably mounted on a second pin, the second pin operatively connected to the housing, the first planet gear also engaging the second planet gear; and
  (d) a driven member rotatably mounted in the housing, the driven member adapted and configured to be driven by the motor;
  (e) a clutch pack having a set of friction plates and a set of reaction plates;
  (f) one of the sets of friction plates and reaction plates operatively connected to the driven member and the other of the sets of friction plates and reaction plates operatively connected to one of the first and second side gears;
  (g) a ball ramp positioned between the housing and the clutch pack, and
  (h) a DC motor operatively connected to the ball ramp, wherein actuation of the DC motor rotates the ball ramp resulting in linear movement of the ball ramp and compression of the clutch pack, thereby coupling the driven member to the one of the first and second side gears.

12. The differential of claim 11, wherein the driven member is a ring gear.

13. The differential of claim 11, the housing further comprising a third, cover section.

14. The differential of claim 11, wherein the friction plates alternate with the reaction plates.

15. The differential of claim 11, further comprising the DC motor having an electrical power, at rated loads, of from 40 to 175 watts.

16. The differential of claim 15, wherein the DC motor is from 64 to 125 watts.

17. The differential of claim 11, further comprising a gear train, the gear train comprising:
  (a) a first gear operatively connected to and driven by the DC motor; and
  (b) a second gear operatively connected to the ball ramp, the gear train having a gear ratio of at least 100:1 to 500:1.

18. The differential of claim 17, wherein the gear ratio is from 150:1 to 350:1.

19. The differential of claim 11, further comprising the ball ramp having an angled surface on which a roller ball moves, the angled surface having an angle of from 0.5 degrees to 15 degrees.

20. The differential of claim 19, wherein the angle is from 2 degrees to 10 degrees.

* * * * *